(12) United States Patent
Shimizu et al.

(10) Patent No.: US 7,942,245 B2
(45) Date of Patent: May 17, 2011

(54) OIL RETURN STRUCTURE FOR VEHICLE DRIVE APPARATUS

(75) Inventors: Tetsuya Shimizu, Anjo (JP); Akira Noguchi, Anjo (JP); Kazuyuki Noda, Anjo (JP); Masaki Yoshida, Okazaki (JP); Tooru Matsubara, Toyota (JP); Kenta Kumazaki, Toyota (JP); Atsushi Tabata, Okazaki (JP); Yuji Iwase, Mishima (JP); Hiroyuki Shibata, Susono (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 548 days.

(21) Appl. No.: 12/076,724

(22) Filed: Mar. 21, 2008

(65) Prior Publication Data

US 2008/0236952 A1    Oct. 2, 2008

(30) Foreign Application Priority Data

Mar. 29, 2007   (JP) ................. 2007-087719

(51) Int. Cl.
*F01M 5/00* (2006.01)
*F01M 9/10* (2006.01)

(52) U.S. Cl. .................. 184/6.9; 184/6; 184/6.12

(58) Field of Classification Search ............. 184/6, 6.22, 184/6.9, 6.12, 6.3; 123/196 R; 74/606 R, 74/606 A See application file for complete search history.

(56) References Cited

U.S. PATENT DOCUMENTS

| | | | | |
|---|---|---|---|---|
| 4,896,561 A | * | 1/1990 | Hayakawa et al. | 74/606 R |
| 4,995,971 A | * | 2/1991 | Droste et al. | 210/167.03 |
| 5,143,034 A | * | 9/1992 | Hirose | 123/196 R |
| 6,182,624 B1 | * | 2/2001 | Ozeki | 123/90.33 |
| 7,637,336 B2 | * | 12/2009 | Enomoto et al. | 180/69.1 |
| 2006/0231339 A1 | | 10/2006 | Enomoto et al. | |

FOREIGN PATENT DOCUMENTS

| | | |
|---|---|---|
| JP | A-61-45155 | 3/1986 |
| JP | A-61-052448 | 3/1986 |
| JP | U-1-111866 | 7/1989 |
| JP | A-10-252874 | 9/1998 |
| JP | A-2005-344938 | 12/2005 |
| JP | A-2006-266306 | 10/2006 |

* cited by examiner

*Primary Examiner* — Michael R Mansen
*Assistant Examiner* — Robert T Reese
(74) *Attorney, Agent, or Firm* — Oliff & Berridge, PLC

(57) ABSTRACT

An oil return structure for a vehicle drive apparatus includes a hydraulic control apparatus disposed below an oil supply target device to which oil for lubricating and cooling is supplied; and an oil pan that retains the oil that is supplied to the oil supply target device is provided below the hydraulic control apparatus, wherein a bypass oil path is formed in a body of the hydraulic control apparatus, the bypass oil path being structured in order to guide the oil from the oil supply target device from an upper surface of the body, inside the body and then discharge the oil from a side surface of the body.

24 Claims, 7 Drawing Sheets

OIL RETURN STRUCTURE FOR VEHICLE DRIVE APPARATUS

INCORPORATION BY REFERENCE

The disclosure of Japanese Patent Application No. 2007-087719 filed on Mar. 29, 2007 including the specification, drawings and abstract is incorporated herein by reference in its entirety.

BACKGROUND

The present invention relates to oil return structures for vehicle drive apparatuses.

There exists a vehicle drive apparatus where the entire vehicle drive apparatus is structured compactly by forming an opening on the bottom portion of a case that houses the automatic transmission, which serves as an oil supply target device, disposing a hydraulic control apparatus under the automatic transmission such that the upper side thereof is inserted inside the case from the opening in the bottom portion of the case, and installing an oil pan such that the hydraulic control apparatus is covered from below (refer, for example, to Japanese Patent Application Publication No. JP-A-2005-344938).

In the structure described above, the oil that has been retained in the oil pan is drawn up by an oil pump and fed to the hydraulic control apparatus. In addition, in the hydraulic control apparatus, the flow of the oil is switched, the pressure of the oil is adjusted, and a portion of the oil is supplied to each of the friction engaging elements of the transmission as operating oil. In addition, the remaining oil is supplied to, for example, the support bearings and the rotating elements of the transmission for the lubricating and cooling thereof. In addition, the oil for lubricating and cooling that has been supplied to the transmission flows down over the inner surface of the case toward the bottom portion of the case, and then returns to the oil pan from the opening that is formed in the bottom portion thereof.

SUMMARY

However, in the structure described above, the hydraulic control apparatus closes off most of the opening in the case bottom portion because the top side of the hydraulic control apparatus is inserted inside the case from the opening. Thus, much of the oil from the transmission flows down to the upper surface of the hydraulic control apparatus, and then gradually flows down over the surface of the hydraulic control apparatus toward the oil pan. Furthermore, in this hydraulic control apparatus, a plurality of irregularities are formed in the upper surface thereof because a plurality of spool holes and the like are formed in order to accommodate the valve spools and the like inside this body. Thus, much of the oil from the transmission stagnates in each of the recessed portions of the upper surface in the hydraulic control apparatus, and the oil that overflows from each of the recessed portions gradually flows down over the surface of the hydraulic control apparatus to the oil pan.

That is, the oil that has been supplied to the oil supply target devices for lubricating and cooling does not readily return to the oil pan due to being hindered by the hydraulic control apparatus. As a result, there is a concern that this may invite, for example, the intake of air, which is a factor in the reduction of the oil level in the oil pan.

The present invention thus makes the oil that has been supplied to the oil supply target devices for lubricating and cooling return to the oil pan with high efficiency, and effectively suppress the intake of air, which is a factor in the reduction of the oil level. The present invention can also achieve various other advantages.

A first exemplary aspect of the present invention includes an oil return structure for a vehicle drive apparatus that includes a hydraulic control apparatus disposed below an oil supply target device to which oil for lubricating and cooling is supplied; and an oil pan that retains the oil that is supplied to the oil supply target device is provided below the hydraulic control apparatus, wherein a bypass oil path is formed in a body of the hydraulic control apparatus, the bypass oil path being structured in order to guide the oil from the oil supply target device from an upper surface of the body, inside the body and then discharge the oil from a side surface of the body.

BRIEF DESCRIPTION OF THE DRAWINGS

Various exemplary aspects of the invention will be described with reference to the drawings, wherein.

DETAILED DESCRIPTION OF EMBODIMENTS

Embodiments where the present invention is applied to a hybrid vehicle will be explained below with reference to the drawings.

[Overall Structure of the Vehicle]

Figure 1:
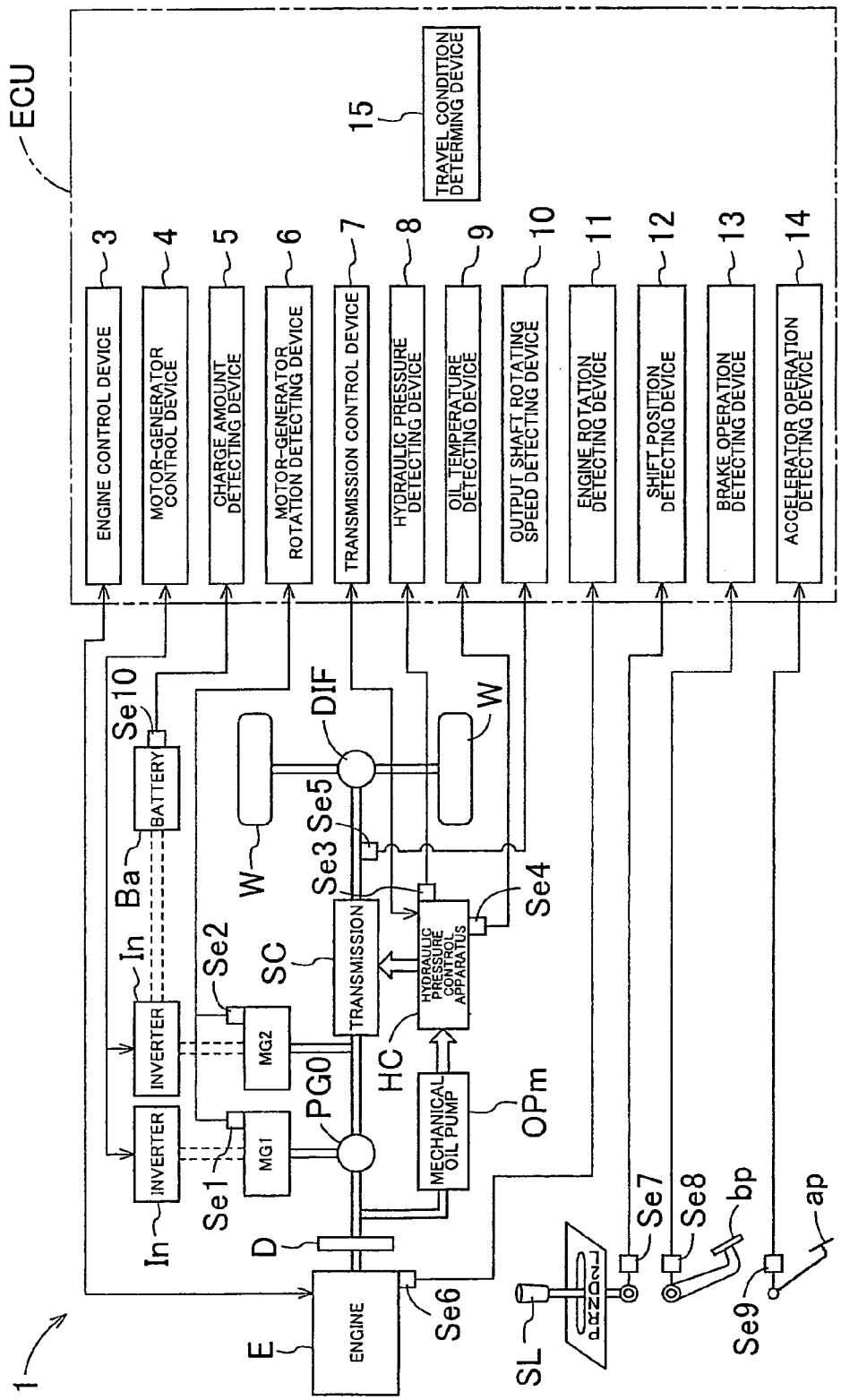
FIG. 1 is a block drawing that shows a schematic structure of a drive train for a hybrid vehicle.
Figure 2:
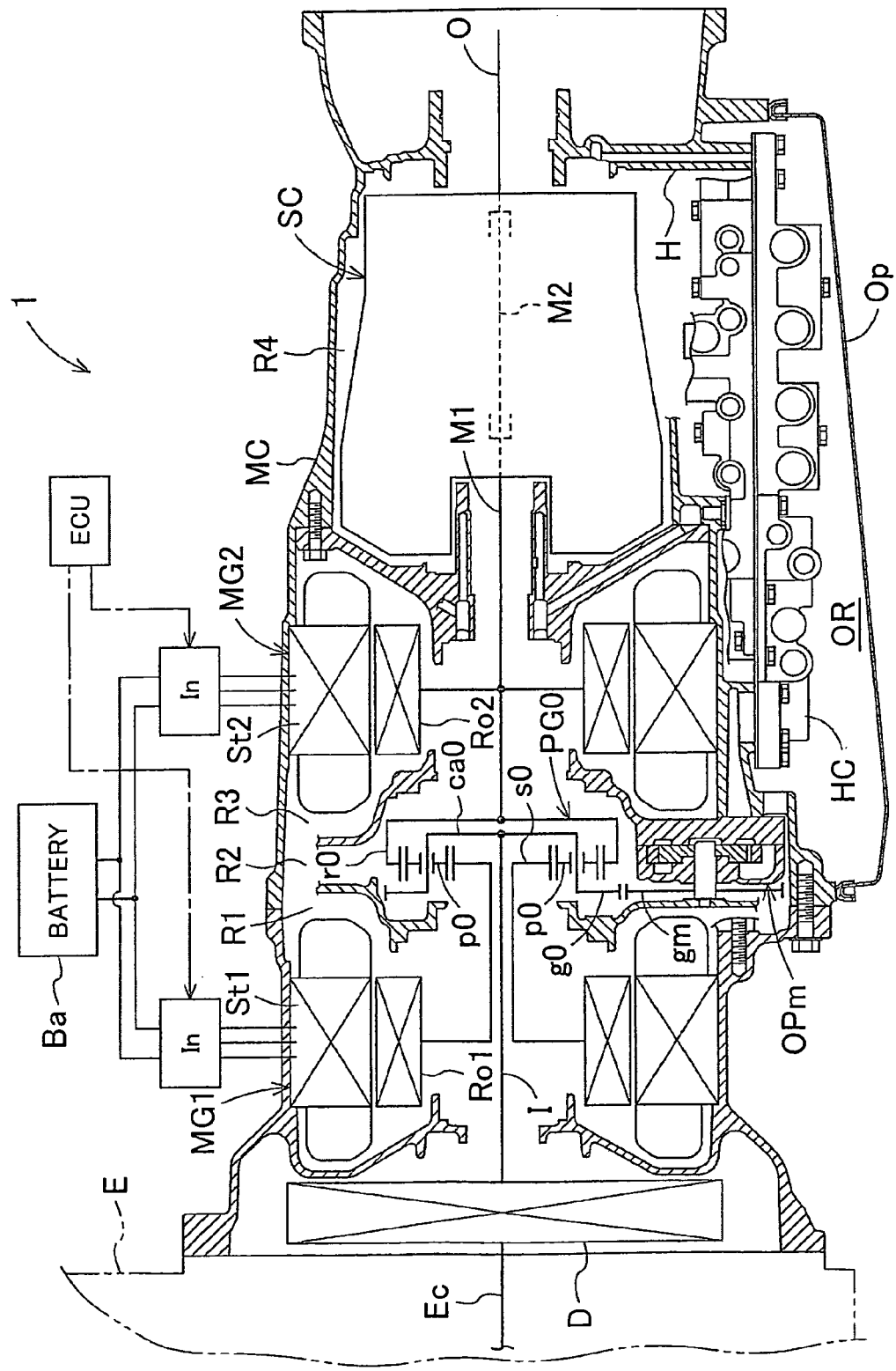
FIG. 2 is a longitudinal cross-sectional view that shows the schematic structure of the drive train for the hybrid vehicle.

FIG. 1 is a block diagram that schematically shows a basic structure of a drive train of a hybrid vehicle. FIG. 2 is a longitudinal cross-sectional view that schematically shows the basic structure of the drive train of a hybrid vehicle. As shown in FIG. 1 and FIG. 2, in this hybrid vehicle, an FR hybrid system is used that drives left and right rear wheels by using the drive power from a vehicle drive apparatus 1 that is disposed in the front thereof.

[Structure of the Vehicle Drive Apparatus 1]

As shown in FIG. 2, the vehicle drive apparatus 1 is provided with an engine E, a power distribution mechanism PG0, a first motor-generator (an example of a rotary electric machine) MG1, a second motor-generator (an example of a rotary electric machine) MG2, an automatic transmission SC, a hydraulic control apparatus HC, and the like. In the vehicle drive apparatus 1, in sequence from the front side thereof, a crankshaft Ec of the engine E, an input shaft I, a first intermediate shaft M1, a second intermediate shaft M2, and an output shaft O are disposed coaxially.

The crankshaft Ec and the input shaft I are drive linked via a damper apparatus D. The damper apparatus D suppresses vibrations in the drive chain by absorbing the fluctuations in the output of the engine E. Note that it is possible to use a structure in which the crankshaft Ec and the input shaft I are directly linked without having the damper apparatus D interposed therebetween. The output shaft O is drive linked to the left and right rear wheels W via a propeller shaft (not illustrated) or a differential apparatus DIF (refer to FIG. 1).

The power distribution mechanism PG0 is disposed so as to span between the input shaft I and the first intermediate shaft M1. In addition, the power distribution mechanism PG0 distributes and transfers the drive power that is transferred from the engine E via the damper apparatus D and the input shaft I to the first motor-generator MG1 and the first intermediate shaft M1, as necessary.

The first motor-generator MG1 mainly functions as a generator, and generates electricity by using the drive power from the power distribution mechanism PG0 and carries out the charging of a battery Ba or the driving of the second motor-generator MG2 by using this electric power. However, the first motor-generator MG1 may also function as a motor during high speed travel. The first motor-generator MG1 operates according to control commands from an electronic control unit ECU.

The second motor-generator MG2 functions mainly as a motor that assists the drive of the back wheels W. However, the second motor-generator MG2 functions as a generator during deceleration and regenerates the inertia of the vehicle as electrical energy. The second motor-generator MG2 operates according to control commands from the electronic control unit ECU.

Specifically, the vehicle drive apparatus 1 is structured as a coaxial drive split-type vehicle drive apparatus that distributes the drive power from the engine E to the left and right rear wheels W and to the generators, and drives the left and right rear wheels W by using the drive power from the engine E and the drive power from the motors.

In the vehicle drive apparatus 1, the power distribution mechanism PG0, the first motor-generator MG1, the second motor-generator MG2, and the transmission SC are provided inside the case MC. In the case MC, a first housing chamber R1 that houses the first motor-generator MG1, a second housing camber R2 that houses the power distribution mechanism PG0, and a third housing chamber R3 that houses the second motor-generator MG2, and a fourth housing chamber R4 that houses the transmission SC are defined. An opening H is formed in the bottom portion of the fourth housing chamber R4 in the case MC. The hydraulic control apparatus HC is disposed such that the upper side thereof is inserted inside the case MC from the opening H at a position below the second motor-generator MG2 and the transmission SC at the bottom portion of the case MC. In addition, at the bottom portion of the case MC, an oil pan Op is provided so as to cover the opening H and the hydraulic control apparatus HC from below. In addition, an oil retaining chamber is formed by the bottom portion of the case MC and the oil pan Op. That is, the vehicle drive apparatus 1 is formed compactly overall because the hydraulic control apparatus HC is disposed at the bottom portion of the case MC such that the upper side thereof inserts inside the case MC from the opening H.

Figure 3:
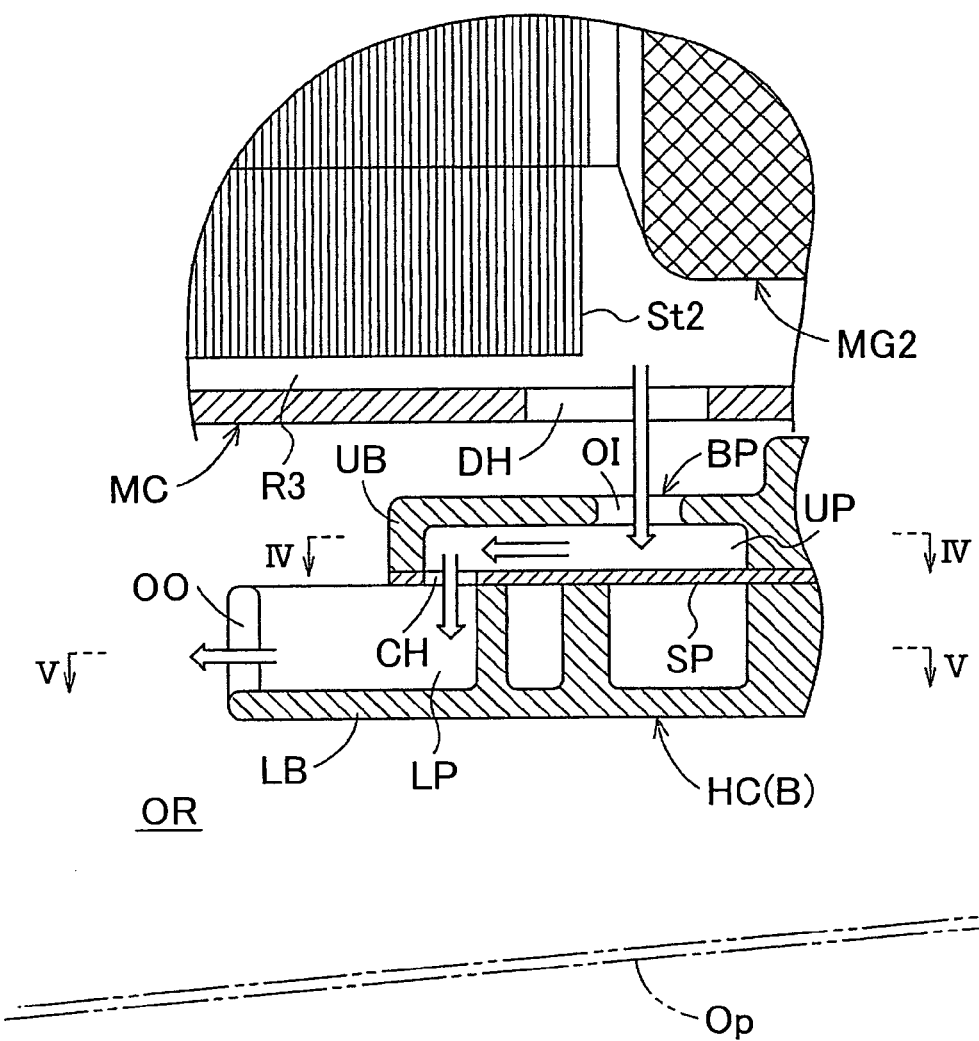
FIG. 3 is a longitudinal cross-sectional view of the elements that shows an oil return structure.

The hydraulic control apparatus HC is structured so as to be provided with a plurality of valves (not illustrated) and the like in a body B (FIG. 3). In the hydraulic control apparatus HC, the body B is structured by interposing a separating plate SP between a die-casting upper body UB and lower body LB. A plurality of oil paths (not illustrated) and a plurality of spool holes (not illustrated) and the like are formed in the bottom surface side of the upper body UB. A plurality of oil paths (not illustrated) and a plurality of spool holes (not illustrated) and the like are formed in the upper surface side of the lower body LB. A plurality of communicating holes (not illustrated) and the like that communicate with predetermined oil paths of the upper body UB and the lower body LB are formed in the separating plate SP. Among the plurality of valves, the electromagnetic valves are operated according to control commands from the electronic control unit ECU. Thereby, the hydraulic control apparatus HC controls the flow and the pressure of the oil that is supplied due to the drive of the mechanical oil pump OPm.

[Structure of the Power Distribution Mechanism PG0]

As shown in FIG. 2, the power distribution mechanism PG0 is structured by a single pinion planetary gear mechanism that is disposed coaxially to the input shaft I. Specifically, the power distribution mechanism PG0 is provided with, as rotating elements, a carrier ca0 that supports a plurality of pinion gears p0, and a sun gear s0 and a ring gear r0 that each mesh with the pinion gears p0. In the power distribution mechanism PG0, the carrier ca0 is linked to the input shaft I so as to rotate integrally therewith. The sun gear s0 is linked to a rotor Ro1 of the first motor-generator MG1 so as to rotate integrally therewith. The ring gear r0 is linked to the first intermediate shaft M1 so as to rotate integrally therewith.

Thereby, the power distribution mechanism PG0 distributes the drive power that has been transferred from the engine E to the carrier ca0 via the input shaft I between the first motor-generator MG1 side and the first intermediate shaft M1 side based on the rotational control of the first motor-generator MG1.

In addition, a drive gear g0 is linked to the carrier ca0 of the power distribution mechanism PG0 so as to rotate integrally therewith. This drive gear g0 meshes with an input gear gm of a mechanical oil pump OPm. Specifically, the mechanical oil pump OPm is driven by the drive power that is transferred from the engine E via the damper apparatus D, the input shaft I, the carrier ca0 of the power distribution mechanism PG0, and the drive gear g0.

[Structure of the First Motor-generator MG1]

As shown in FIG. 2, the first motor-generator MG1 is provided with a stator St1 that is fastened to the case MC and a rotor Ro1 that is rotatably disposed inside this stator St1 in the radial direction. In the first motor-generator MG1, the rotor Ro1 is rotatably supported relative to the input shaft I along with the sun gear s0 of the power distribution mechanism PG0. The first motor-generator MG1 is electrically connected to the second motor-generator MG2 and the battery Ba via an inverter In. In addition, the first motor-generator MG1 functions as a motor that converts the electrical energy from the second motor-generator MG2 and the battery Ba into mechanical energy, or functions as a generator that converts mechanical energy from the engine E into electrical energy.

[Structure of the Second Motor-generator MG2]

As shown in FIG. 2, the second motor-generator MG2 is provided with a stator St2 that is fastened to the case MC and a rotor Ro2 that is rotatably disposed inside this stator St2 in the radial direction. In the second motor-generator MG2, the rotor Ro2 is linked to the first intermediate shaft M1 so as to rotate integrally therewith. The second motor-generator MG2 is electrically connected to the first motor-generator MG1 and the battery Ba via the inverter In. In addition, the second motor-generator MG2 functions as a motor that converts the electrical energy from the first motor-generator MG1 and the battery Ba into mechanical energy, or functions as a generator that converts mechanical energy from the engine E into electrical energy.

[Structure of the Transmission SC]

As shown in FIG. 2, the transmission SC is disposed so as to span the first intermediate shaft M1 and the output shaft O. Although not illustrated, the transmission SC is provided with a planetary gear apparatus that is provided with a plurality of rotating elements and a plurality of hydraulic friction engaging elements that act on the corresponding rotating elements. A plurality of brakes that switch the shift speed of the transmission SC is included in the plurality of friction engaging elements. Each of the brakes is structured by a plurality of wet multi-plate clutches, and is hydraulically operated in a brake engaged state that prevents the rotation of the corresponding rotating elements and a brake released state that permits the rotation thereof depending on the hydraulic control of the hydraulic control apparatus HC. Thereby, the shift speeds of the transmission SC are switched.

[Structure of the Electronic Control Unit ECU]

As shown in FIG. 1, the electronic control unit ECU controls the operation of the engine E, the first motor-generator MG1, the second motor-generator MG2, the hydraulic control apparatus HC, and the transmission SC based on information that is output from the first sensor Se1 to the tenth sensor Se10, which are provided in each part of the vehicle. The first sensor Se1 detects information that is related to the rotating speed of the rotor Ro1 of the first motor-generator MG1. The second sensor Se2 detects information that is related to the rotating speed of the rotor Ro2 of the second motor-generator MG2. The third sensor Se3 detects information that is related to the base hydraulic pressure, which is the pressure of the oil that is supplied to the hydraulic control apparatus HC. The fourth sensor Se4 detects information that is related to the temperature of the oil that is supplied from the hydraulic control apparatus HC. The fifth sensor Se5 detects information that is related to the rotating speed of the output shaft O. The sixth sensor Se6 detects information that is related to the rotating speed of the crankshaft Ec of the engine E. The seventh sensor Se7 detects information that is related to the operating position of a shift lever SL, which carries out the speed change operation of the transmission SC. The eighth sensor Se8 detects information that is related to the operating amount of a brake pedal bp that is linked to wheel brakes (not illustrated). The ninth sensor Se9 detects information that is related to the operating amount of an accelerator pedal ap. The tenth sensor Se10 detects information that is related to the charge amount of the battery Ba.

The electronic control unit ECU is provided with an engine control device 3, a motor-generator control device 4, a charge amount detecting device 5, a motor-generator rotation detecting device 6, a transmission control device 7, a hydraulic pressure detecting device 8, an oil temperature detecting device 9, an output shaft rotating speed detecting device 10, an engine rotation detection device 11, a shift position detecting device 12, a brake operation detecting device 13, an accelerator operation detecting device 14, and a travel condition determining device 15. Each of these devices in the electronic control unit ECU are structured so as to use an arithmetic processing apparatus such as a CPU as a core and the functional portions that carry out the various processes on the input information are provided by hardware, software (programs), or both.

The engine control device 3 carries out the operational control of, for example, the start-up and stopping, rotating speed control, and output torque control of the engine E. In addition, the engine control device 3 controls the operation of the engine according to the engine operating points (the rotating speed and the output torque) that are determined by the travel condition determining device 15.

The motor-generator control device 4 carries out the operational control of, for example, the rotating speed control and the rotational torque control of the first motor-generator MG1 and the second motor-generator MG2 via the inverter In. Specifically, the rotating speed control is carried out by controlling the frequency of the electrical power that is supplied to the first motor-generator MG1 and the second motor-generator MG2. In addition, the rotational torque control is carried out by controlling the current or the voltage that is supplied to the first motor-generator MG1 and the second motor-generator MG2. The motor-generator control device 4 controls the operation of the motor-generators according to the motor-generator operating points (the rotating speed and the rotational torque) that have been determined for each of the motor-generators by the travel condition determining device 15.

The charge amount detecting device 5 finds the charge amount of the battery Ba based on information from the tenth sensor Se10. The motor-generator rotation detecting device 6 finds the rotating speed of the rotor Ro1 of the first motor-generator MG1 and the rotor Ro2 of the second motor-generator MG2 based on information from the first sensor Se1 and the second sensor Sr2. The transmission control device 7 controls the operation of each of the friction engaging elements of the transmission SC by controlling the operation of the hydraulic control apparatus HC, and carries out speed change control in which the shift speed of the transmission SC is switched. The hydraulic pressure detecting device 8 finds the base hydraulic pressure, which is the pressure of the oil that is supplied to the hydraulic control apparatus HC based on information from the third sensor Se3. The oil temperature detecting device 9 finds the temperature of the oil that is supplied from the hydraulic control apparatus HC to each of the components of the transmission SC based on the information from the fourth sensor Se4.

The output shaft rotating speed detecting device 10 finds the rotating speed of the output shaft O of the vehicle drive apparatus 1 based on the information from the fifth sensor Se5. The engine rotation detecting device 11 finds the rotating speed of the crankshaft Ec of the engine based on information from the sixth sensor Se6. The shift position detecting device 12 finds the operating position of the shift lever SL based on information from the seventh sensor Se7. The brake operation detecting device 13 finds an operating amount of the wheel brakes, or specifically, the operating amount of the brake pedal bp by the driver, based on information from the eighth sensor Se8. The accelerator operation detecting device 14 finds the operating amount of the accelerator pedal ap by the driver based on information from the ninth sensor Se9.

The travel condition determining device 15 determines the required drive power based on the operating amount of the wheel brakes that has been found by the brake operation detecting device 13 and the operating amount of the accelerator pedal ap that has been found by the accelerator operation detecting device 14. In addition, the travel condition determining device 15 determines the shift speed of the transmission SC based on the required drive power that has been determined, the output shaft rotating speed that has been found by the output shaft rotating speed detecting device 10, which is equivalent to the travel speed, and the shift maps that have been found in advance. Based on the shift speed that has been determined in this manner, the transmission control device 7 controls the operation of the transmission SC.

Furthermore, the travel condition determining device 15 determines the engine operating points (the rotating speed and the output torque) and the motor-generator operating points (the rotating speed and the rotating torque) in relation to the required drive power that has been determined in the manner that has been described above. The engine control device 3 controls the operation of the engine E based on the engine operating points that have been determined in this manner, and the motor-generator control device 4 controls the operation of each of the motor-generators MG1 and MG2 based on the motor-generator operating points.

For example, the travel condition determining device 15 determines the operating points of the engine based on an engine operating point map that has been found in advance, and determines the operating points of the second motor-generator MG2 such that torque that is insufficient when using only the output of the engine E is supplemented by the output of the second motor-generator MG2. The operating points of the other first motor-generator MG1 are determined such that the requirements of the drive power distribution in the power distribution mechanism PG0 are satisfied.

[Circulation Structure for the Oil]

Although not illustrated, a plurality of oil paths are formed in the case MC, the input shaft I, the first intermediate shaft M1, and the second intermediate shaft M2. In addition, oil that is retained in the oil pan Op is drawn up by the mechanical oil pump OPm and fed to the hydraulic control apparatus HC. In this hydraulic control apparatus HC, the flow of the oil is switched, the pressure of the oil is adjusted, and a portion of this oil is supplied for operation to each of the friction engaging elements of the transmission SC via the corresponding operating oil paths. In addition, the remaining oil is supplied for lubricating and cooling to the oil paths for lubricating and cooling that are formed in the input shaft I, the first immediate shaft M1, and the second intermediate shaft M2 via the corresponding lubricating and cooling oil paths that are formed in the case MC. In addition, because of the centrifugal force that is due to the rotational drive of each of these shafts I, M1, and M2, the oil is supplied to the prescribed lubrication targets and cooling targets from the oil paths for lubricating and cooling for each of these shafts I, M1, and M2.

The targets to be lubricated by the oil from the oil paths for the lubricating and cooling of the input shaft I include, for example, the supporting bearings of the first motor-generator MG1 and each of the rotating elements of the power distribution mechanism PG0. The targets to be cooled by the oil from the oil paths for the lubricating and cooling of the input shaft I include the first motor-generator MG1. The targets to be lubricated by the oil from the oil paths for the lubricating and cooling of the first intermediate shaft M1 include the support bearings of the second motor-generator MG2 and a portion of the support bearings and the rotating elements of the transmission SC. The targets to be cooled by the oil from the oil paths for the lubricating and cooling of the first intermediate shaft M1 include the second motor-generator MG2 and a portion of the friction engaging elements in the transmission SC. The targets to be lubricated by the oil from the oil paths for the lubricating and cooling of the second motor-generator MG2 include the remaining support bearings and rotating elements in the transmission SC. The targets to be cooled by the oil from the oil paths for the lubricating and cooling of the second intermediate shaft M2 include the remaining friction engaging elements in the transmission SC.

Specifically, in the present embodiment, the power distribution mechanism PG0, the first motor-generator MG1, the second motor-generator MG2, and the transmission SC are oil supply target devices to which the oil for lubricating and cooling is supplied.

The oil for lubricating and cooling that is supplied to the first motor-generator MG1 flows down over the inner surface of the first housing chamber R1 toward the bottom portion of the first housing chamber R1. The oil for lubricating and cooling that is supplied to the power distribution mechanism PG0 flows down over the inner surface of the second housing chamber R2 toward the bottom portion of the second housing chamber R2. The oil for lubricating and cooling that is supplied to the second motor-generator MG2 flows down over the inner surface of the third housing chamber R3 toward the bottom portion of the third housing chamber R3. The oil for lubricating and cooling that is supplied to the transmission SC flows down over the inner surface of the fourth housing chamber R4 toward the bottom portion of the fourth housing chamber R4.

The oil that flows down to the bottom portion of the first housing chamber R1 returns to the oil pan Op via a first drain oil path that is formed in the case MC so as to span from the bottom portion thereof to the front portion of an oil retaining chamber OR. The oil that flows down to the bottom portion of the second housing chamber R2 returns to the oil pan Op via a second drain oil path that is formed in the case MC so as to span from the bottom portion to the front portion of the oil retaining chamber OR. The oil that flows down to the bottom portion of the third housing chamber R3 returns to the oil pan Op via a third drain oil path that is formed in the case MC so as to span from the bottom portion thereof to the front portion of the oil retaining chamber OR. The oil that flows down to the bottom portion of the fourth housing chamber R4 returns to the oil pan Op from the opening H in this bottom portion.

Figure 4:
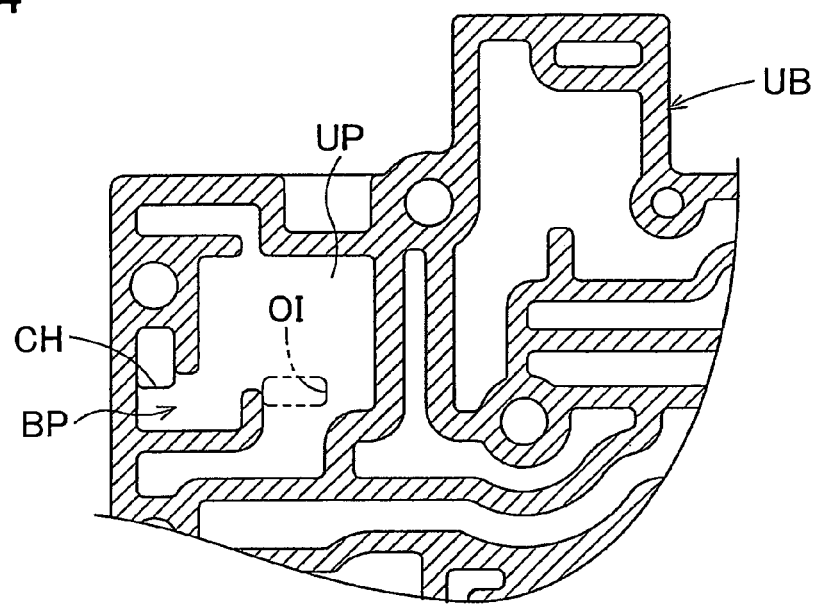
FIG. 4 is a cross-sectional view along IV-IV in FIG. 3.
Figure 5:
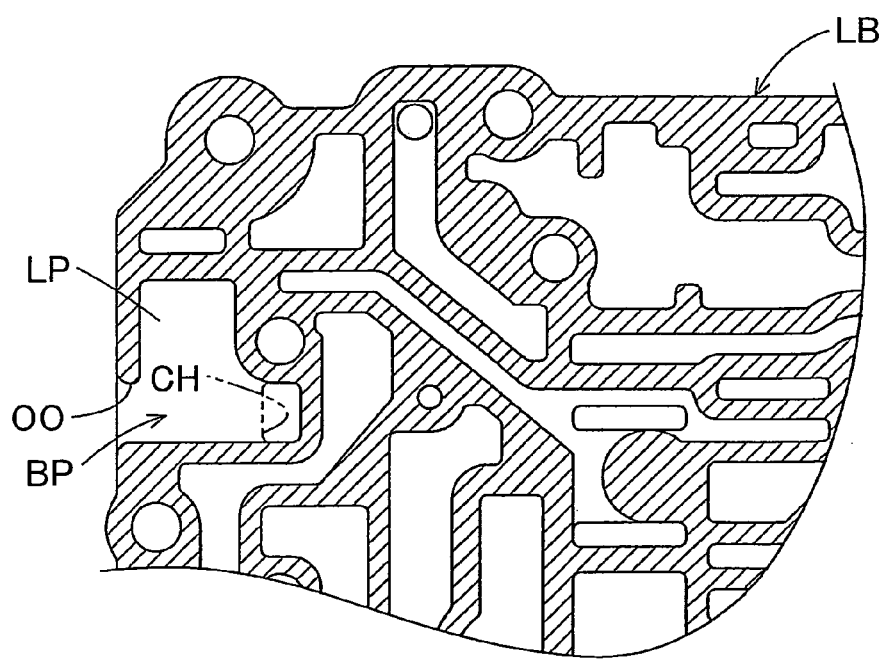
FIG. 5 is a cross-sectional view along V-V in FIG. 3.
Figure 6:
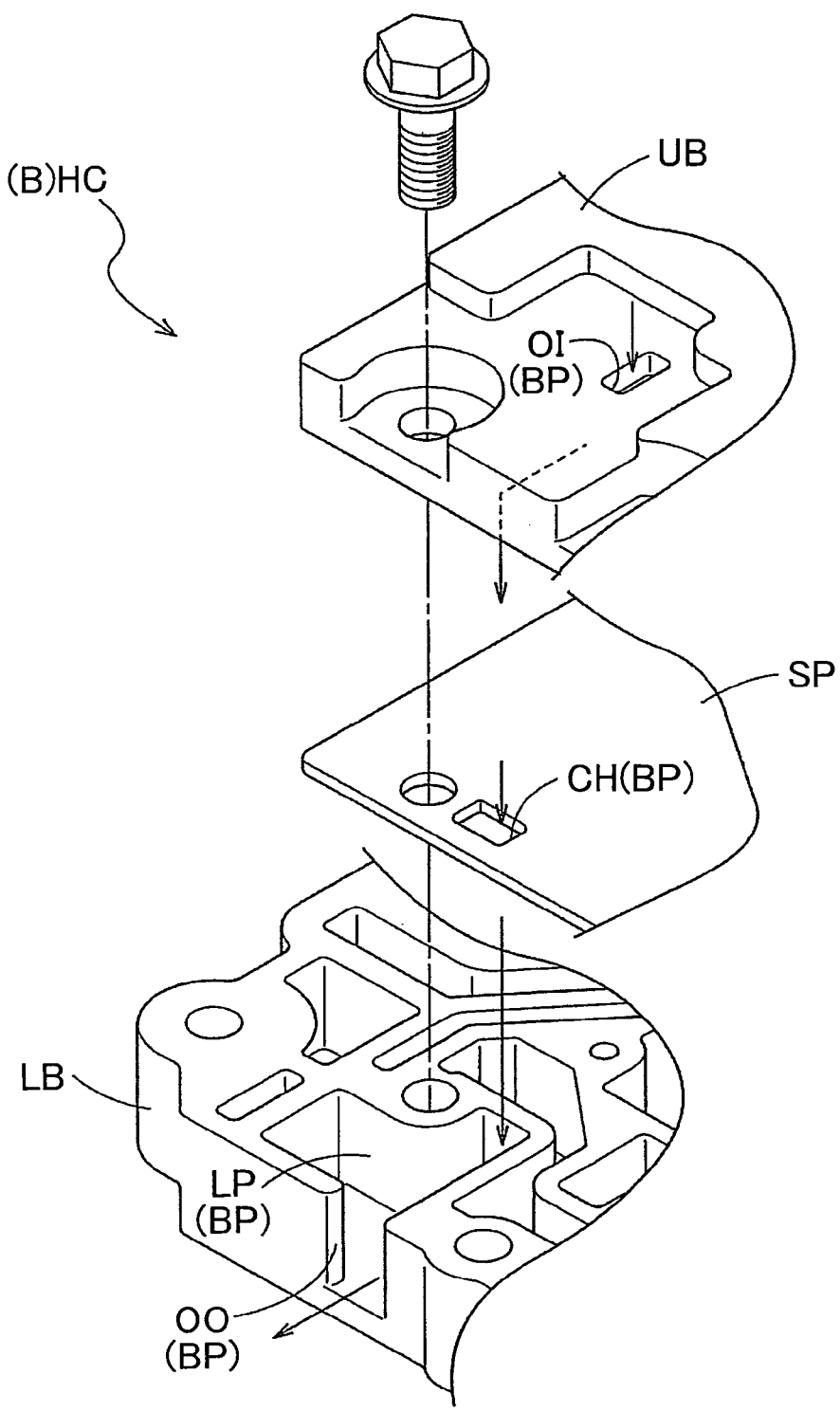
FIG. 6 is an exploded perspective view of the elements that shows the oil return structure.

FIG. 3 is a longitudinal cross-sectional view of components that shows the oil return structure from the third housing chamber R3. FIG. 4 is a cross-sectional view along IV-IV in FIG. 3. FIG. 5 is a cross-sectional view along V-V in FIG. 3. FIG. 6 is an exploded perspective view of the components that shows the oil return structure from the third housing chamber R3. As shown in FIG. 3, a drain hole DH, which serves as the third drain oil path, is formed in the bottom portion of the third housing chamber R3 in the case MC. The drain hole DH opposes the right front end portion of the hydraulic control apparatus HC, which is positioned therebelow.

As shown in FIG. 3 to FIG. 6, at the front right end portion of the hydraulic control apparatus HC, an upper inner oil path UP is formed as a recess in the bottom surface (the contact surface that is in contact with the separating plate SP) of the upper body UB. An oil feed hole OI that appears as a rectangle in a plane view is formed as an oil feed path that spans from the upper face of the upper body UB to the upper inner oil path UP at a position that is opposed to the drain hole DH in the upper face of the upper body UB. A lower inner oil path LP, which partially coincides with the upper inner oil path UP in a plane view, and an oil discharge path OO, which spans from this lower inner oil path LP to the front surface of the lower body LB (the side surface on the front side of the vehicle), are formed as recesses in the upper surface (the contact surface that is in contact with the separating plate SP) of the lower body LB. The location at which the upper inner oil path UP and the lower inner oil path LP coincide is set so as to be positioned more toward the front than the position at which the oil feed hole OI is formed. In the separating plate SP, a communicating hole CH, which coincides with the upper inner oil path UP and the lower inner oil path LP, is formed at the location at which the upper inner oil path UP and the lower inner oil path LP coincide.

Specifically, in this oil return structure, a bypass oil path BP, which spans from the upper surface of the hydraulic control apparatus HC to the front surface thereof, is formed at the front right end portion of the hydraulic control apparatus HC that is opposed to the drain hole DH by the oil feed hole OI, the upper inner oil path UP, the communicating hole CH, the lower inner oil path LP, and the oil discharge path OO. In addition, the oil from the second motor-generator MG2, which has been discharged from the drain hold DH, is guided inside the body B from the upper surface of the body B by this bypass oil path BP, and is discharged from the front face of the body B to the oil pan Op through the inner portion of this body B. Thereby, the oil from the second motor-generator MG2, which is discharged from the drain hole DH, is not retained on the upper surface of the body B, and flows down quickly toward the oil pan Op via the bypass oil path BP. As a result, it is possible to avoid the oil level in the oil retaining chamber OR from decreasing due to the oil from the second motor-generator MG2 collecting on the upper surface of the body B, and it is possible, for example, to prevent the intake of air, which is a factor in the reduction of the oil level. Furthermore, because a structure is used in which the oil is discharged from the front surface of the body B, it is possible to suppress the reverse flow of the oil through the bypass oil path BP effectively even if a large amount of oil rapidly flows towards the front side of the vehicle in the inside portion of the oil retaining chamber OR due to the sudden braking of the vehicle.

In addition, the bypass oil path BP is formed into a labyrinth shape (stepped shape) due to the upper inner oil path UP and the lower inner oil path LP communicating by the communicating hole CH, which is formed at a position that is offset in a plane view from the location where the oil feed hole OI is formed. Thereby, it is possible to suppress more effectively the reverse flow of oil into the bypass oil path BP, which may cause concern when a large quantity of oil will rapidly flow toward the oil retaining chamber OR due to rapid braking. Furthermore, simply by forming the bypass oil path BP into a labyrinth shape, it is possible to realize a reduction in costs, a simplification of the structure, downsizing, and weight reduction in comparison to the case in which a check valve for preventing reverse flow is provided in the bypass oil path BP.

Furthermore, because the communicating hole CH is formed at a position on the front side that is closer to the oil discharge path OO than the position at which the oil feed hole OI is formed, it is possible to shorten the lower inner oil path LP and it is possible to shorten the overall length of the bypass oil path BP in comparison to the case in which the communication hole CH is formed at a position on the back side that is more distant from the oil discharge path OO than the position at which the oil feed hole OI is formed. Thereby, it is possible to prevent the bypass oil path BP from becoming complex, and at the same time, it is possible for the oil from the second motor-generator MG2 to quickly return to the oil pan Op.

Alternative Embodiments (1) In the embodiments described above, an example was provided in which the present invention is applied to a hybrid vehicle. However, in addition to hybrid vehicles, the present invention can be applied to typical FR vehicles, FF vehicles, RR vehicles, and 4WD vehicles. In addition, it is also possible to apply the present invention to electric vehicles that are not equipped with the engine E. However, it is preferable to provide the hydraulic control apparatus HC below the oil supply target devices (first motor-generator MG1, second motor-generator MG2, and the transmission SC) to which the oil for lubricating and cooling is supplied, and it is preferable to provide the oil pan Op below the hydraulic control apparatus HC.

(2) In the embodiment described above, an example was provided in which a FR hybrid system is used as the hybrid vehicle to which the present invention is applied. However, as a hybrid vehicle, an FF hybrid system in which the left and right front wheels are driven by drive power from the vehicle drive apparatus 1 that is provided on the front portion may be used, and a four wheel drive hybrid system in which the left and right front wheels and rear wheels are driven by drive power from the vehicle drive apparatus 1 may be used. However, it is preferable to provide the hydraulic control apparatus HC below the oil supply target devices (first motor-generator MG1, second motor-generator MG2, and the transmission SC) to which the oil for lubricating and cooling is supplied, and it is preferable to provide the oil pan Op below the hydraulic control apparatus HC.

(3) In the embodiments described above, an example was provided in which a split-type vehicle drive apparatus is used as the vehicle drive apparatus 1. However, as a vehicle drive apparatus 1, a series-type or a parallel-type vehicle drive apparatus may be used. In the series type, the generator is driven by drive power from the engine E, the motor is driven by electrical power from this generator, and the wheels are driven by drive power from the motors. In the parallel type, the wheels are directly driven by drive power from both the engine E and the motors. However, it is preferable to provide the hydraulic control apparatus HC below the oil supply target devices (the generators, the motors, and the transmission SC) to which the oil for lubricating and cooling is supplied, and it is preferable to provide the oil pan Op below the hydraulic control apparatus HC.

(4) In the embodiment described above, an example was provided in which the vehicle drive apparatus 1 is one that is provided with the engine E, the first motor-generator MG1, the second motor-generator MG2, and the transmission SC. However, a vehicle drive apparatus 1 may be used in which any one of the engine E, the first motor-generator MG1, the second motor-generator MG2, and the transmission SC are not provided, or one in which, instead of the first motor-generator MG1 and the second motor-generator MG2, a motor and a generator are provided. However, it is preferable to provide the hydraulic control apparatus HC below the oil supply target devices (the first motor-generator MG1, the second motor-generator MG2, the generators, the motors, and the transmission SC) to which the oil for lubricating and cooling is supplied, and it is preferable to provide the oil pan Op below the hydraulic control apparatus HC.

(5) In the embodiment described above, an example was provided in which the present invention is applied to the oil return structure from the second motor-generator MG2 (the third housing chamber 3), which is one example of an oil supply target device. However, the present invention may also be applied to an oil return structure that receives oil from the power distribution mechanism PG0 (second housing chamber R2), the first motor-generator MG1 (first housing chamber R1), or the transmission SC (fourth housing chamber R4), which are examples of the oil supply target devices.

For example, when the present invention is applied to an oil return structure that receives oil from the power distribution mechanism PG0, a bypass oil path BP that spans from the upper surface of the hydraulic control apparatus HC to the side surface thereof is formed at a predetermined location on the hydraulic control apparatus HC that is opposed to the discharge opening of the second drain oil path, which returns the oil from the power distribution mechanism PG0 (second housing chamber R2) to the oil pan Op. In addition, when the present invention is applied to an oil return structure that receives oil from the first motor-generator MG1, a bypass oil path BP that spans from the upper surface of the hydraulic control apparatus HC to the side surface thereof is formed at a predetermined location on the hydraulic control apparatus HC that is opposed to the discharge opening of the first drain oil path, which returns the oil from the first motor-generator MG1 (first housing chamber R1) to the oil pan Op. Furthermore, when the present invention is applied to an oil return structure that receives oil from the transmission SC, the bypass oil path BP that spans from the upper surface of the hydraulic control apparatus HC to the front surface thereof is formed at predetermined locations on the hydraulic control apparatus HC that is opposed to the opening H, which returns the oil from the transmission SC (fourth housing chamber R4) to the oil pan Op.

(6) In the embodiment described above, an example was provided in which one bypass oil path BP is formed in the body B of the hydraulic control apparatus HC. However, the number of the bypass oil paths BP can be modified as appropriate.

(7) In the embodiments described above, an example was provided in which the oil return structure is one that has a structure in which the oil from the oil supply target devices, which is fed to the bypass oil path BP, is discharged to the oil pan Op from the front surface (the side surface on the front side of the vehicle), which is an example of a side surface of the body B. However, an oil return structure may be used that has a structure in which the oil from the oil supply target devices, which is fed to the bypass oil path BP, is discharged to the oil pan Op from, for example, the right side surface or the left side surface, which are examples of the side surfaces of the body B.

Figure 7:
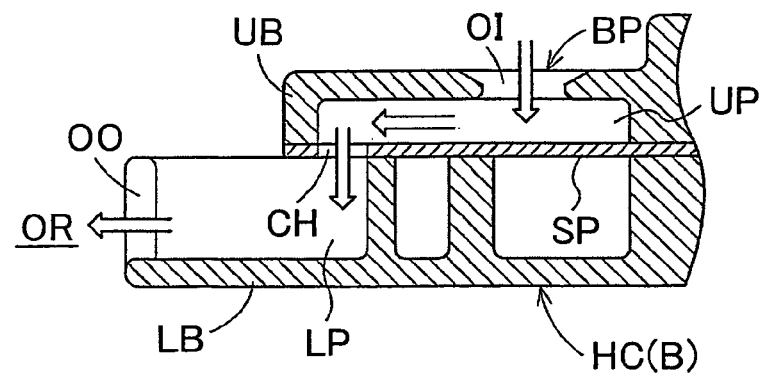
FIG. 7 is a longitudinal cross-sectional view of the elements that shows the oil return structure of an alternative embodiment, in which an upper surface side portion of an oil feed path is formed so as to widen upward.

(8) As shown in FIG. 7, the bypass oil path BP may be one in which the upper surface side portion in the oil feed path OI may be formed in a shape that widens toward the top so that the opening area becomes larger approaching the upper side. In this manner, it is possible to increase the collection rate of the oil from the oil supply target devices. As a result, the oil from the oil supply target devices can return to the oil pan Op with a higher efficiency, and it is possible to prevent more reliably the intake of air, which is a factor in the reduction of the oil level. In addition, although not illustrated, the collection rate of oil from the oil supply target devices may be improved by forming the oil feed path OI such that the opening area thereof becomes larger than the opening area of the communicating hole CH.

(9) In the embodiment described above, an example was provided in which the bypass oil path BP is one in which the communicating hole CH is formed at a position on the front side that is closer to the oil discharge path OO than the position at which the oil feed hole OI is formed. However, the bypass oil path BP may be one in which the communicating hole CH is formed at the side of or at the back of the oil feed hole OI. In addition, the bypass oil path BP may be formed at a position where the oil feed hole OI and the communicating hole CH coincide in a plane view.

Figure 8:
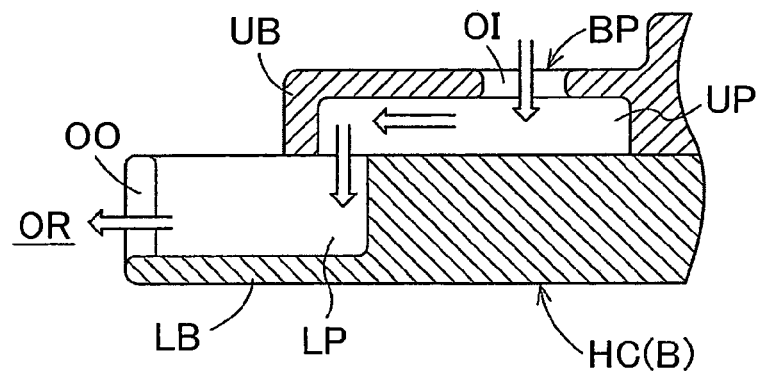
FIG. 8 is a longitudinal cross-sectional view of the elements that shows the oil return structure of an alternative embodiment, in which a body of a hydraulic control apparatus is structured by an upper body and a lower body.

(10) As shown in FIG. 8, the body B of the hydraulic control apparatus HC may be formed from an upper body UB and a lower body LB that are engaged vertically. In this structure, for example, the upper inner oil path UP may be formed as a recess in the bottom surface of the upper body UB (the contact surface that is in contact with the lower body LB). The oil feed path OI that spans from the upper surface of the upper body UB to the upper inner oil path UP is formed at a position that opposes the discharge opening (not illustrated) of the drain oil path at the upper surface of the upper body UB, leading from the oil supply target devices. The lower inner oil path LP, which partially communicates with the upper inner oil path UP, and the oil discharge path OO, which spans from this lower inner oil path LP to the front surface of the lower body LB (an example of a side surface), are formed as recesses in the upper surface (the contact surface that is in contact with the upper body UB) of the lower body LB. Thereby, it is possible to form the bypass oil path BP that spans from the upper surface of the hydraulic control apparatus HC to the front surface thereof by the oil feed hole OI, the upper inner oil path UP, the communicating hole CH, the lower inner oil path LP, and the oil discharge path OO.

In addition, although not illustrated, the body B of the hydraulic control apparatus HC may be formed from an upper body and a lower plate that are engaged vertically. In this structure, for example, the upper inner oil path and the oil discharge path OO that spans from the upper inner oil path to the front surface of the upper body UB (an example of a side surface) are formed as recesses in the bottom surface (the contact surface that is in contact with the lower plate) of the upper body UB. The oil feed path that spans from the upper surface of the upper body UB to the upper inner oil path is formed at a position that is opposed to the discharge opening of the drain oil path in the upper surface of the upper body UB, leading from the oil supply target devices. Thus, it is possible to form the bypass oil path BP that spans from the upper surface of the hydraulic control apparatus HC to the front surface thereof by the oil feed hole OI, the upper inner oil path UP, and the oil discharge path OO.

Furthermore, although not illustrated, the body B of the hydraulic control apparatus HC may be formed from an upper plate and a lower body that are engaged vertically.

Figure 9:
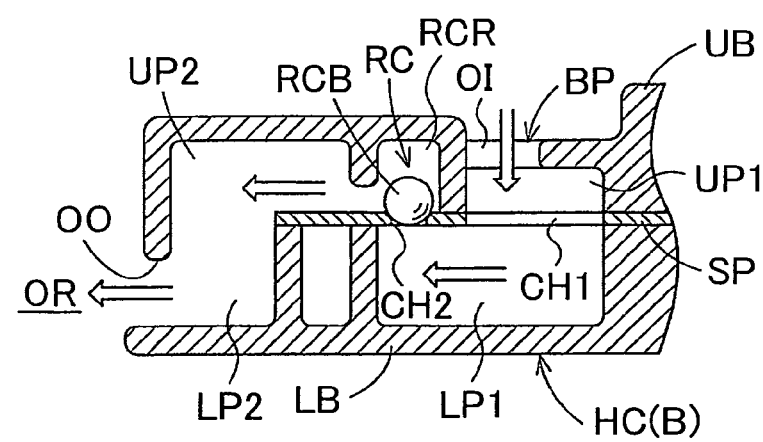
FIG. 9 is a longitudinal cross-sectional view of the elements that shows an oil return structure of the alternative embodiment, in which a small reverse flow check device RC is provided on the bypass oil path.
Figure 10:
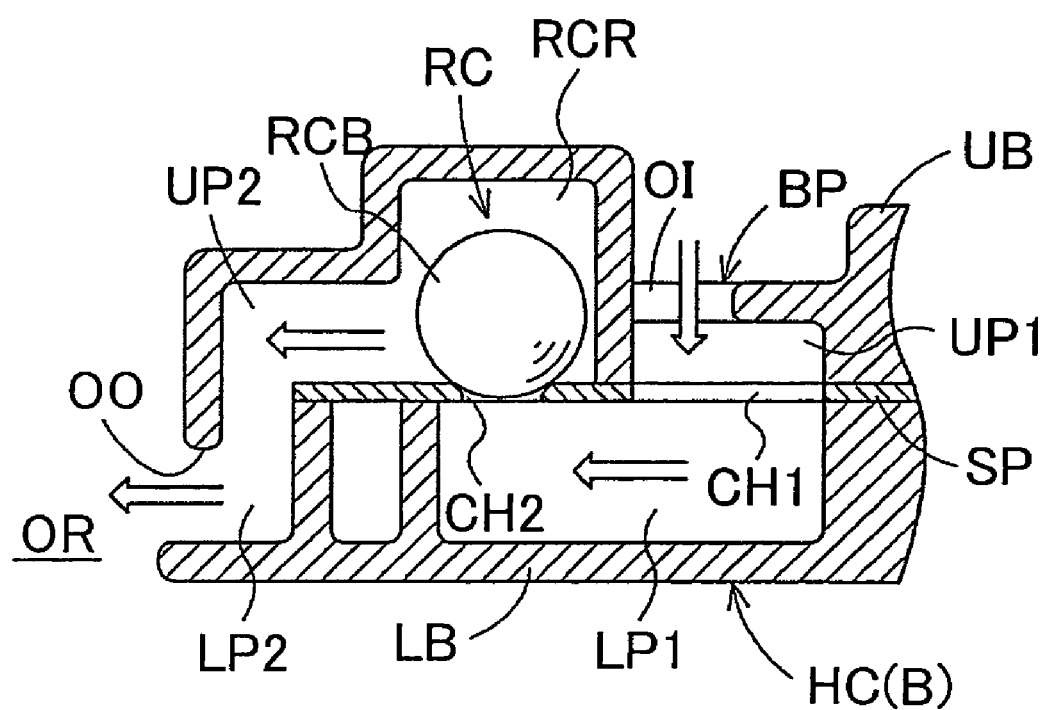
FIG. 10 is a longitudinal cross-sectional view of the elements that shows the oil return structure of the alternative embodiment, in which a large reverse flow check device RC is provided on the bypass oil path.

(11) As shown in FIG. 9 and FIG. 10, the bypass oil path BP may be one that is structured so as to be provided with a reverse flow check device RC that permits the flow of oil from the oil feed path OI to the oil discharge path OO and suppresses the flow of oil from the oil discharge path OO to the oil feed path OI.

Below, the structure of the bypass oil path BP that is provided with a reverse flow check device RC will be described in detail with reference to FIG. 9 and FIG. 10. In the hydraulic control apparatus HC, an first upper inner oil path UP1, a second upper inner oil path UP2 and the reverse flow preventing chamber RCR (communicated with the second upper inner oil path UP2) are formed as a recess in the bottom surface (the contact surface that is in contact with the separating plate SP) of upper body UB. The oil feed path OI that spans from the upper surface of the upper body UB to the first upper inner oil path UP1 is formed at a position that is opposed to the discharge opening (not illustrated) of the drain oil path in the upper surface of the upper body UB, leading from the oil supply target devices. A first lower inner oil path LP1 that partially coincides in a plane view with the first upper inner oil path UP1 and the reverse flow preventing chamber RCR, a second lower inner oil path LP2 that communicates with a portion of the second upper inner oil path UP2, and the oil discharge path OO that spans from this second lower inner oil path LP2 to the front surface (an example of a side surface) of the lower body LB are formed as recesses in the upper surface (the contact surface that is in contact with the separating plate SP) of the lower body LB. A first communicating hole CH1 and a second communicating hole CH2 are formed in the separating plate SP. The first communicating hole CH1 communicates the first upper inner oil path UP1 and the first lower inner oil path LP1 at locations where the first upper inner oil path UP1 and the first lower inner oil path LP1 coincide, and the second communicating hole CH2 communicates the first lower inner oil path LP1 and the reverse flow preventing chamber RCR at locations where the first lower inner oil path LP1 and the reverse flow preventing chamber RCR coincide. A reverse flow preventing ball RCB that opens and closes the second communicating hole CH2 due to the pressure differential between the oil feed path side and the oil discharge path side in the bypass oil path BP is provided in the reverse flow preventing chamber RCR.

Specifically, in this oil return structure, the bypass oil path BP that spans from the upper surface of the hydraulic control apparatus HC to the lower surface thereof is formed by the oil feed hole OI, the first upper inner oil path UP1, the first communicating hole CH1, the first lower inner oil path LP1, the second communicating hole CH2, the reverse flow preventing chamber RCR, the second upper inner oil path UP2, the second lower inner oil path LP2, and the oil discharge path OO. In addition, the reverse flow check device RC is structured by the second communicating hole CH2, the reverse flow preventing chamber RCR, and the reverse flow preventing ball RCB. In addition, because this structure is provided with the reverse flow check device RC, it is possible to suppress effectively the reverse flow of oil into the bypass oil path BP, which may cause concern when a large quantity of oil inside the oil retaining chamber OR suddenly flows toward the front side of the vehicle due to the rapid braking of the vehicle.

In addition, in this oil return structure, the bypass oil path BP may be formed into a more complicated labyrinth shape by the first upper inner oil path UP1 and the first lower inner oil path LP1 being communicated by the first communicating hole CH1, the first lower inner oil path LP1 and the reverse flow preventing chamber RCR being communicated by the second communicating hole CH2, and the second upper inner oil path UP1 and the second lower inner oil path LP2 being communicated. Thereby, it is possible to suppress more effectively the reverse flow of the oil in the bypass oil path BP described above.

In this connection, in the bypass oil path BP that is shown in FIG. 9, a structure is used in which the opening area of the second communicating hole CH2 is smaller than the opening area of the first communicating hole CH1 in the bypass oil path BP that is shown in FIG. 10, and the size of the reverse flow preventing chamber RCR is smaller than the size of the reverse flow preventing ball RCB in the bypass oil path BP that is shown in FIG. 10. Thereby, the hydraulic control apparatus HC in which the bypass oil path BP that is shown in FIG. 8 is formed can be structured so as to be more light weight and more compact in comparison to the hydraulic control apparatus HC in which the bypass oil path BP that is shown in FIG. 9 is formed.

In addition, in the bypass oil path BP that is shown in FIG. 10, the first communicating hole CH1 is formed such that the opening area thereof is larger than the opening area of the second communicating hole CH2 in the bypass oil path BP that is shown in FIG. 9. Thereby, in the bypass oil path BP that is shown in FIG. 10, the flow of the oil from the oil feed hole OI to the oil discharge path OO becomes advantageous. As a result, the oil from the oil supply target devices can return to the oil pan Op more quickly.

Moreover, various modifications of the structure and the disposition of the reverse flow check device RC are possible. For example, instead of the reverse flow preventing ball RCB, a structure may be used that is provided with a poppet valve.

(12) A bypass oil path BP may be one that is formed by drilling after the formation of the body B.

According to an exemplary aspect of the invention, the oil that flows down from the oil supply target device to the upper surface of the hydraulic control apparatus is discharged from the side surface of the body to an oil pan after passing from the upper surface of the body through the inside of the body. That is, the oil from the oil supply target device quickly flows down toward the oil pan without stagnating on the upper surface of the body.

In this connection, a structure for causing the oil from the oil supply target device to flow down quickly toward the oil pan may be considered in which the bypass oil path that has a linear shape is formed spanning from the upper surface of the body to the bottom surface thereof. However, in this structure, there is a significant concern that when a large amount of the oil in the oil pan suddenly flows toward the front side of the vehicle due to the sudden braking of the vehicle, the oil on the oil pan side will enter the bypass oil path from the bottom surface of the body, will flow back through the bypass oil path, and will blow out upward from the upper surface of the body. When such a phenomenon occurs, the oil level is reduced and the oil that has been dispersed due to blowing out does not readily return to the oil pan, and thereby the recovery of the oil level is delayed. Thus, for example, the intake of air, which is a factor in the reduction of the oil level, easily occurs.

Thus, in the present invention, the bypass oil path is formed so as to span from the upper surface of the body to the side surface thereof, and thereby, in comparison to the case in which the bypass oil path is formed so as to span from the upper surface of the body to the bottom surface thereof, it is possible to suppress the entry of oil from the oil pan side into the bypass oil path in the case in which a large amount of oil in the oil pan suddenly flows toward the front side of the vehicle due to the sudden braking of the vehicle. In addition, due to the effect of this suppression, the flow rate of the oil that enters from the side surface of the body into the bypass oil is reduced. Furthermore, because the bypass oil path has a shape such as an L-shape that spans from the upper surface of the body to the side surface thereof, the flow rate of the oil that enters the bypass oil path from the side surface of the body is further reduced.

Specifically, because the bypass oil path is structured so as to span from the upper surface of the body to the side surface thereof, it is possible to suppress effectively the reverse flow of oil into the bypass oil path, which may cause concern in the case in which a large amount of oil in the oil pan suddenly flows toward the front side of the vehicle due to the sudden braking of the vehicle. Thereby, it is possible to prevent effectively the reduction of the oil level in the oil pan due to, for example, the oil from the oil supply target devices stagnating on the upper surface of the body or gradually flowing down over the surface of the body, and the oil on the oil pan side flowing back through the bypass oil path.

As a result, it is possible to promote the stabilization of the oil level in the oil pan, and it is possible to prevent effectively, for example, the intake of air, which is a factor in the reduction of the oil level.

According to an exemplary aspect of the invention, during casting such as die-casting, it is possible to form the bypass oil path when the upper body and the lower body, which are provided with a plurality of oil paths for hydraulic control, are formed.

As a result, the manufacturing does not become complicated due to a subsequent installation of the bypass oil path, and it is possible to suppress effectively, for example, the intake of air, which is a factor in the reduction of the oil level in the oil pan.

According to an exemplary aspect of the invention, during casting such as die-casting, the upper body and the lower body, which are provided with a plurality of oil paths for hydraulic control, are formed, and by a press process or the like, it is possible to form the bypass oil path when the separating plate, which is provided with the communicating hole for hydraulic control, is formed.

As a result, the manufacturing does not become complicated due to a subsequent installation of the bypass oil path, and it is possible to suppress effectively, for example, the intake of air, which is a factor in the reduction of the oil level in the oil pan.

According to an exemplary aspect of the invention, it is possible to form the bypass oil path in a step shape that is more complicated than the L-shape. Thereby, it is possible to suppress more effectively the reverse flow of the oil into the bypass oil path.

As a result, it is possible to prevent reliably, for example, the intake of air, which is a factor in the reduction of the oil level in the oil pan, due to the reverse flow of the oil in the bypass oil path.

According to an exemplary aspect of the invention, while suppressing the reverse flow of the oil into the bypass oil path, it is possible to increase the collection rate of the oil from the oil supply target devices, and it is possible to return the oil from the oil supply target devices to the oil pan more efficiently.

As a result, it is possible to prevent more effectively the reduction of the oil level in the oil pan, and it is possible to prevent more effectively, for example, the intake of air, which is a factor in the reduction of this oil level.

According to an exemplary aspect of the invention, it is possible to suppress more effectively the reverse flow of oil into the bypass oil path.

As a result, it is possible to prevent more reliably, for example, the intake of air, which is a factor in the reduction of the oil level in the oil pan, due to the reverse flow of the oil into the bypass oil path.

According to an exemplary aspect of the invention, the bypass oil path is formed in a more complicated labyrinth shape that traverses the upper body and the lower body, and the reverse flow check device is provided on the bypass oil path.

As a result, it is possible to suppress more effectively the reverse flow of the oil in the bypass oil path, and it is possible to prevent more reliably, for example, the intake of air, which is a factor in the reduction of the oil level in the oil path, due to the reverse flow of the oil into the bypass oil path.

According to an exemplary aspect of the invention, it is possible to increase the collection rate of the oil from the oil supply target devices, and is it possible to return the oil from the oil supply target devices more efficiently to the oil pan.

As a result, it is possible to prevent more effectively, for example, the intake of air, which is a factor in the reduction of the oil level in the oil pan.

According to an exemplary aspect of the invention, in comparison to the case in which the bypass oil path is formed such that the oil from the oil supply target devices is discharged from the side surface of the body on back side of the vehicle or the side surfaces of the body on the right and left sides of the vehicle, it is possible to suppress more effectively the entry of the oil on the oil path side into the bypass oil path when a large amount of oil in the oil pan suddenly flows toward the front side of the vehicle due to the sudden braking of the vehicle. In addition, due to this suppression effect, the flow rate of the oil that enters into the bypass oil path from the side surface of the body on the front side of the vehicle is significantly reduced.

As a result, it is possible to prevent more effectively, for example, the intake of air, which is a factor in the reduction of the oil level in the oil pan, due to the oil on the oil pan side flowing back through the bypass oil path.

According to an exemplary aspect of the invention, it is possible to return a large amount of oil that is used in the cooling of the rotary electric machine, such as a motor and a generator, to the oil pan via the bypass oil path with a high efficiency.

As a result, in an electrical vehicle or a hybrid vehicle that is provided with a rotary electric machine, it is possible to prevent effectively, for example, the intake of air, which is a factor in the reduction of the oil level in the oil pan.

According to an exemplary aspect of the invention, it is possible to return a large amount of oil that is used in the cooling of the rotary electric machine, such as a motor or a generator, and the lubricating and cooling of the support bearings and the rotating elements of the transmission to the oil pan via the bypass oil path with a high efficiency.

As a result, in an electrical vehicle or a hybrid vehicle that is provided with a rotary electric machine and a transmission, it is possible to prevent effectively, for example, the intake of air, which is a factor in the reduction of the oil level in the oil pan.

According to an exemplary aspect of the invention, it is possible to return a large amount of oil that is used in the cooling of the rotary electric machine, such as a motor or a generator, and the lubricating and cooling of the support bearings and the rotating elements of the transmission to the oil pan via the bypass oil path with a high efficiency.

As a result, in a hybrid vehicle in which either one of or both of the drive power from the engine and the drive power from the rotary electric machine are transferred to the transmission, and it is possible to prevent effectively, for example, the intake of air, which is a factor in the reduction of the oil level in the oil pan.

What is claimed is:

1. An oil return structure for a vehicle drive apparatus, comprising:
   a hydraulic control apparatus disposed below an oil supply target device to which oil for lubricating and cooling is supplied; and
   an oil pan that retains the oil that is supplied to the oil supply target device is provided below the hydraulic control apparatus,
   wherein a bypass oil path is formed in a body of the hydraulic control apparatus, the bypass oil path being structured in order to guide the oil from the oil supply target device from an upper surface of the body, inside the body and then discharge the oil from a side surface of the body.

2. The oil return structure for the vehicle drive apparatus according to claim 1, wherein:
   the body is formed by an upper body and a lower body that are engaged vertically;
   an inner oil path, in the upper body and the lower body, is formed on either one of, or on both of, the contact surfaces thereof;
   an oil feed path that spans from an upper surface of the upper body to the inner oil path is formed in the upper body;
   an oil discharge path, in the upper body and the lower body, that spans from a side surface of the upper body or a side surface of the lower body to the inner oil path is formed on either one of, or on both of, the contact surfaces thereof; and the bypass oil path is formed by the oil feed path, the inner oil path, and the oil discharge path.

3. The oil return structure for the vehicle drive apparatus according to claim 2, wherein a reverse flow check device that permits a flow of the oil from the oil feed path toward the oil discharge path and suppresses the flow of the oil from the oil discharge path toward the oil feed path is provided in the bypass oil path.

4. The oil return structure for the vehicle drive apparatus according to claim 3, wherein:

a first inner oil path, at least a portion of which coincides in a plane view with the inner oil path of the lower body, and a second inner oil path, at least a portion of which coincides in the plane view with the inner oil path of the lower body, that communicate with the oil feed path are formed as the inner oil path in the contact surface of the upper body;

a first communicating hole that communicates the first inner oil path and the inner oil path of the lower body, and a second communicating hole that communicates the second inner oil path and the inner oil path of the lower body are formed as the communicating hole; and a reverse flow check device that permits the flow of oil from the oil feed path toward the oil discharge path and suppresses the flow of the oil from the oil discharge path toward the oil feed path is provided in the second communicating hole.

5. The oil return structure for the vehicle drive apparatus according to claim 4, wherein an upper surface side location of the oil feed path is formed in an upwardly widening shape in which an opening area becomes larger toward the upper side thereof.

6. The oil return structure for the vehicle drive apparatus according to claim 5, wherein the bypass oil path is formed such that the oil from the oil supply target device is discharged from a side surface of the body at the front side of the vehicle.

7. The oil return structure for the vehicle drive apparatus according to claim 6, wherein:

a rotary electric machine is provided as the oil supply target device, and a housing chamber that houses this rotary electric machine is formed; and the bypass oil path is formed such that the oil from the housing chamber is guided from the upper surface of the body to the inside of the body.

8. The oil return structure for the vehicle drive apparatus according to claim 7, wherein a rotary electric machine and a transmission are provided as the oil supply target device, and the rotary electric machine is provided at a front of the vehicle with respect to the transmission.

9. The oil return structure for the vehicle drive apparatus according to claim 8, wherein either one of, or both of, drive power from an engine and drive power from the rotary electric machine are transferred to the transmission.

10. The oil return structure for the vehicle drive apparatus according to claim 1, wherein:

the body is formed by interposing a separating plate between an upper body and a lower body;

inner oil paths are formed such that at least a portion thereof coincides in a plane view at respective contact surfaces of the upper body and the lower body that are in contact with the separating plate;

an oil feed path that spans from an upper surface of the upper body to an inner oil path is formed in the upper body;

an oil discharge path that spans from a side surface of the upper body or a side surface of the lower body to the inner oil path is formed on either one of, or on both of, the contact surfaces of the upper body and the lower body;

a communicating hole that communicates the inner oil path of the upper body and the inner oil path of the lower body is formed in the separating plate; and a bypass oil path is formed by the oil feed path, the inner oil path, the communicating hole, and the oil discharge path.

11. The oil return structure for the vehicle drive apparatus according to claim 10, wherein a position of the oil feed path and a position of the oil discharge path are offset in the plane view.

12. The oil return structure for the vehicle drive apparatus according to claim 11, wherein the oil feed path is formed such that an opening area thereof is larger than an opening area of the communicating hole.

13. The oil return structure for the vehicle drive apparatus according to claim 12, wherein a reverse flow check device that permits a flow of the oil from the oil feed path toward the oil discharge path and suppresses the flow of the oil from the oil discharge path toward the oil feed path is provided in the bypass oil path.

14. The oil return structure for the vehicle drive apparatus according to claim 13, wherein an upper surface side location of the oil feed path is formed in an upwardly widening shape in which an opening area becomes larger toward the upper side thereof.

15. The oil return structure for the vehicle drive apparatus according to claim 14, wherein the bypass oil path is formed such that the oil from the oil supply target device is discharged from the side surface of the body at a front side of the vehicle.

16. The oil return structure for the vehicle drive apparatus according to claim 15, wherein:

a rotary electric machine is provided as the oil supply target device, and a housing chamber that houses the rotary electric machine is formed; and the bypass oil path is formed such that the oil from the housing chamber is guided from the upper surface of the body to the inside of the body.

17. The oil return structure for the vehicle drive apparatus according to claim 16, wherein a rotary electric machine and a transmission are provided as the oil supply target device, and the rotary electric machine is provided at a front of the vehicle with respect to the transmission.

18. The oil return structure for the vehicle drive apparatus according to claim 17, wherein either one of, or both of, drive power from an engine and drive power from the rotary electric machine are transferred to the transmission.

19. The oil return structure for the vehicle drive apparatus according to claim 10, wherein the oil feed path is formed such that an opening area thereof is larger than an opening area of the communicating hole.

20. The oil return structure for the vehicle drive apparatus according to claim 1, wherein a reverse flow check device that permits a flow of the oil from an oil feed path toward an oil discharge path and suppresses the flow of the oil from the oil discharge path toward the oil feed path is provided in the bypass oil path.

21. The oil return structure for the vehicle drive apparatus according to claim 1, wherein the bypass oil path is formed such that the oil from the oil supply target device is discharged from the side surface of the body at a front side of the vehicle.

22. The oil return structure for the vehicle drive apparatus according to claim 1, wherein:

a rotary electric machine is provided as the oil supply target device, and a housing chamber that houses this rotary electric machine is formed; and the bypass oil path is formed such that the oil from the housing chamber is guided from the upper surface of the body to the inside of the body.

23. The oil return structure for the vehicle drive apparatus according to claim 1, wherein a rotary electric machine and a transmission are provided as the oil supply target device, and the rotary electric machine is provided at a front of the vehicle with respect to the transmission.

24. The oil return structure for the vehicle drive apparatus according to claim 23, wherein, either one of, or both of, drive power from an engine and drive power from the rotary electric machine are transferred to the transmission.

* * * * *